United States Patent
Blonde et al.

(10) Patent No.: US 7,511,770 B2
(45) Date of Patent: Mar. 31, 2009

(54) METHOD AND DEVICE FOR PROCESSING A VIDEO SIGNAL AIMED AT COMPENSATING FOR THE DEFECTS OF DISPLAY DEVICES

(75) Inventors: Laurent Blonde, Thorigne Fouillard (FR); Didier Doyen, La Bouexiere (FR); Jonathan Kervec, Paimpont (FR)

(73) Assignee: Thomson Licensing, Boulogne-Billancourt (FR)

( * ) Notice: Subject to any disclaimer, the term of this patent is extended or adjusted under 35 U.S.C. 154(b) by 578 days.

(21) Appl. No.: 11/223,728

(22) Filed: Sep. 8, 2005

(65) Prior Publication Data
US 2007/0052863 A1 Mar. 8, 2007

(30) Foreign Application Priority Data
Sep. 21, 2004 (FR) .................................. 04 52114

(51) Int. Cl.
*H04N 5/202* (2006.01)
(52) U.S. Cl. .................. 348/674; 348/254; 348/675
(58) Field of Classification Search ......... 348/674–675, 348/254–255, 678–679, 682–683, 708; 345/63, 345/89; *H04N 5/202*
See application file for complete search history.

(56) References Cited

U.S. PATENT DOCUMENTS

| | | | | |
|---|---|---|---|---|
| 5,510,851 | A * | 4/1996 | Foley et al. | 348/658 |
| 6,144,412 | A * | 11/2000 | Hirano et al. | 348/441 |
| 6,476,824 | B1* | 11/2002 | Suzuki et al. | 345/690 |
| 7,372,507 | B2* | 5/2008 | Ikeda et al. | 348/674 |

FOREIGN PATENT DOCUMENTS

WO   WO 2004/054238 A1   6/2004

OTHER PUBLICATIONS

European Search Report Dated May 27, 2005.
Patent Abstracts of Japan, Pub. No. 2001292340, Pub. Date Oct. 19, 2001; Applicant: Ikegami Tsushinki Co. Ltd., Inventor: Suzuki Taira; Title: Contour Correction Circuit.

* cited by examiner

*Primary Examiner*—Trang U Tran
(74) *Attorney, Agent, or Firm*—Robert D. Shedd; Joseph J. Opalach; Reitseng Lin

(57) ABSTRACT

The invention relates to a method and device for processing video images aimed at compensating for the defects of display devices. According to the invention, the method is characterized in that it comprises the following steps:

correction of a video signal by a specific gamma law associated with a first component from among said horizontal and vertical components of said video signal, first video processing acting on said first component of the corrected video signal, application, to the video signal processed, of an intermediate law effecting the transfer from a space which is linear with respect to the first component to a space which is linear with respect to the other of said components, called the second component, second video processing acting on the second component of the video signal emanating from the previous step, and correction of the video signal processed by a specific inverse gamma law associated with the second component.

9 Claims, 3 Drawing Sheets

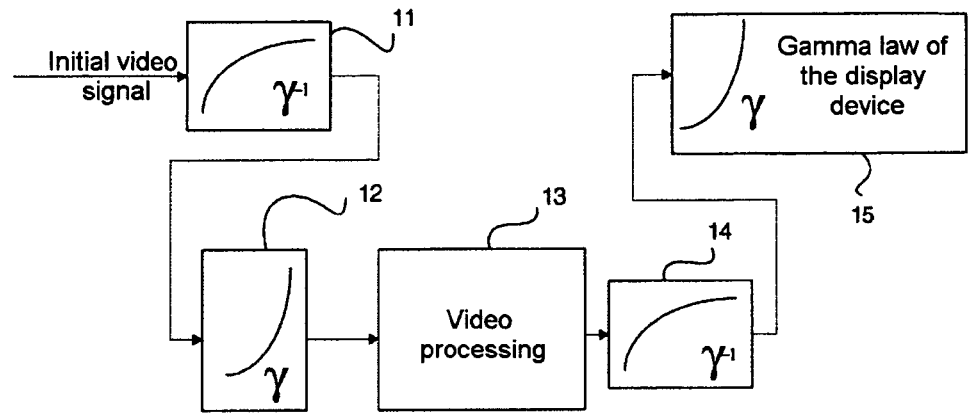
Fig. 1 - State of the art
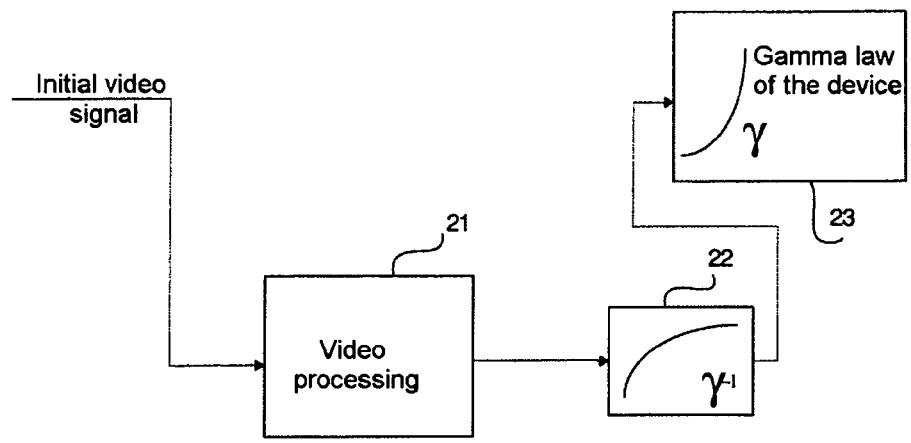
Fig. 2 - State of the art

METHOD AND DEVICE FOR PROCESSING A VIDEO SIGNAL AIMED AT COMPENSATING FOR THE DEFECTS OF DISPLAY DEVICES

FIELD OF THE INVENTION

The invention relates to a method and a device for processing video images aimed at compensating for the defects of certain display devices, in particular nonlinear display devices (for example cathode ray tubes).

BACKGROUND OF THE INVENTION

A video signal may be represented in various spaces interlinked by a transfer function. Thus, the representation space for the colour levels consists of a set of integers, varying for example between 0 and 255. The visualization space is, for its part, the space in which the optical signal is generated and perceived.

In most video image display devices, the representation space for the colour levels and the visualization space are related by a nonlinear law called the electro-optical transfer function or more commonly the gamma law. The luminous intensity reproduced on the screen is therefore a nonlinear function of the colour level at the input of the display device.

The transfer function relating the two representation spaces is characteristic of the type of display device. In the case of cathode ray tubes, the gamma law of the tube has the following form:

$$n_{out} = N_{out} \cdot \left(\frac{n_{in}}{N_{in}}\right)^{\gamma}$$

$n_{in}$ is the input level,
$n_{out}$ is the output level,
$N_{in}$ is the maximum level characterizing $n_{in}$,
$N_{out}$ is the maximum level characterizing $n_{out}$,
$\gamma$ is the coefficient characterizing the transfer function.

According to the state of the art, it is known, in order to estimate the gamma law of a display device, to display on the latter a series of uniform images whose level varies from 0 to 255. We then measure the light level L(n) emitted by the screen for each input level n, then we normalize this curve by the maximum of these input levels: $\gamma=255*L(n)/L(255)$.

FIG. 1 and FIG. 2 illustrate a method of processing according to the state of the art of a video signal pre-corrected (FIG. 1) or not (FIG. 2) by an inverse gamma law, aimed at reducing the visual defects due to the display device.

The transfer function (also called the posterior law subsequently in the document), described previously and referenced 15 in FIG. 1, has the feature of attenuating the dark pixels. It is known to pre-correct the initial video signal arising from the camera by an inverse gamma law 11 (also called the anterior law subsequently in the document) so as to compensate for this attenuation before transmitting this signal corrected to the display device. This processing which is generally performed at the level of the camera is not mandatory. The value of gamma used to pre-correct the initial video signal is known and specified in various documents in particular the Recommendations of the ITU for television (e.g. ITU-R BT.709-5, *Basic Parameters Values for HDTV*, ITU-R BT.470-6, *Conventional Television System*).

In addition, before displaying the video signal transmitted on the screen, it may be necessary to apply a video processing 13 to the pre-corrected or not pre-corrected video signals so as for example to improve the quality of the signal which will be displayed. The video processing may, for example, be a re-interpolation of video images aimed at correcting distortions in the images. The distortions are due to the display device.

When such a video processing is applied, it is necessary to work in a space which is linear with respect to the visualization space. Specifically, in the converse case we would see the appearance on the displayed image of processing dependent defects. For example, in the case of a re-interpolation the brightness of a point of the image may vary depending on whether it is re-interpolated on one or on n pixels. Specifically, in this case, the visual sum of the intensities of the n pixels is not the same as that of the pixel alone if the processing space is not a linear space with respect to the visualization space.

For this purpose, as illustrated in FIG. 1, it is known to invert on either side of the processing block 13, the anterior law 11 if the initial signal has been pre-corrected and to invert the posterior law 15, respectively in the blocks 12 and 14. The display device modifies according to the gamma law characteristic of the display device the video signal thus corrected.

However, as described previously, a video signal may be generated and produced by the camera without having previously been pre-corrected by an inverse gamma law 11. In this case, as illustrated in FIG. 2, it is known to apply the video processing directly to the initial video signal 21. The signal thus obtained is corrected by an inverse gamma law 22, so as to compensate for the attenuation of the dark points introduced by the transfer function of the tube. The display device 23 modifies the video signal thus corrected according to the gamma law characteristic of the display device.

The method according to the state of the art, though it makes it possible to correct certain defects (for example attenuation of the dark points), does not take account of certain characteristics of certain display devices which depend on the direction of visualization (e.g. inter-pixel overlap, shape of the spot).

Thus, in the case of the application of video processing which successively applies to the horizontal (X) and vertical components of the image (Y), the application of a global gamma law may cause visual defects. The term global gamma law signifies a law which applies in the same manner whether we process the vertical or horizontal components of the video signal. Defects of local attenuation of the red, green and blue signals, generating colour defects are, for example, visible in the case where we apply a processing of re-interpolation of a colour image.

It is therefore desirable in order to process the video signal to take account of the direction (horizontal or vertical) of processing.

SUMMARY OF THE INVENTION

For this purpose, the present invention proposes a method whose objective is to decrease certain visual defects by applying a different gamma law in each of the processing directions (horizontal and vertical). According to the invention, we propose to process a video signal comprising a horizontal component and a vertical component, before the display of the signal by a display device, according to the following steps:
  correction of the video signal by a specific gamma law associated with a first component from among the horizontal and vertical components of the video signal,
  first video processing acting on the first component of the corrected video signal,
  application, to the video signal processed, of an intermediate law effecting the transfer from a space which is linear with respect to the first component to a space which is linear with respect to the other of the horizontal and vertical components, called the second component, second video processing acting on the second component of the video signal emanating from the previous step, and correction of the video signal processed by a specific inverse gamma law associated with the second component of the video signal.

The order of processing of the components of the signal is of no importance.

According to a preferred embodiment, the intermediate gamma law is a composition of the law associated with the second component and of the inverse gamma law associated with the first component. Specifically, after having processed the signal according to one of these components, it is appropriate to adopt a standpoint in a space which is linear according to the other component. Thus, if the Y component has been processed first, it is subsequently appropriate to adopt a standpoint in a space linear in X.

According to a preferred embodiment, the video signal is corrected by the various gamma laws and the intermediate law is applied using correspondence tables which with each input level of the video signal associate an output level calculated according to the appropriate law.

Advantageously, the first and second video processings are processings of re-interpolation of the video signal, respectively according to the first component and according to the second component of the signal.

According to a preferred embodiment, the re-interpolation of the video signal consists of a filtering of the signal, the filter used being a polyphase filter.

According to a preferred embodiment, the resolution in terms of number of bits (or dynamic range) of the video signal is increased during the step of correction by a specific gamma law associated with the first component of the video signal, and we return to the initial resolution during the step of correction by a specific inverse gamma law associated with the second component of the video signal. This increase in the resolution in terms of number of bits may make it possible to eliminate the remaining quantization artefacts.

The invention will apply advantageously to nonmatrix display devices.

The invention also relates to a device intended to implement the method. According to the invention the device comprises:

means for correcting the video signal by a specific gamma law associated with a first component from among the horizontal and vertical components of the video signal, means for applying a first video processing acting on the first component of the corrected video signal, means for applying, to the video signal processed, an intermediate law effecting the transfer from a space which is linear with respect to the first component to a space which is linear with respect to the other of the horizontal and vertical components, called the second component; the means generating an intermediate signal, means for applying a second video processing acting on the second component of the intermediate video signal, and means for correcting the video signal processed by a specific inverse gamma law associated with the second component of the video signal.

BRIEF DESCRIPTION OF THE DRAWINGS

The invention will be better understood and illustrated by means of wholly nonlimiting advantageous exemplary modes of embodiment and implementation, with reference to the appended figures in which:

FIG. 1 illustrates a method of processing a video signal according to the state of the art, aimed at reducing the visual defects due to the display device, in the case where the initial video signal has been pre-corrected by an inverse gamma law;

FIG. 2 illustrates a method of processing a video signal according to the state of the art, aimed at reducing the visual defects due to the display device, in the case where the initial video signal has not been pre-corrected by an inverse gamma law;

DETAILED DESCRIPTION OF PREFERRED EMBODIMENTS

Figure 3:
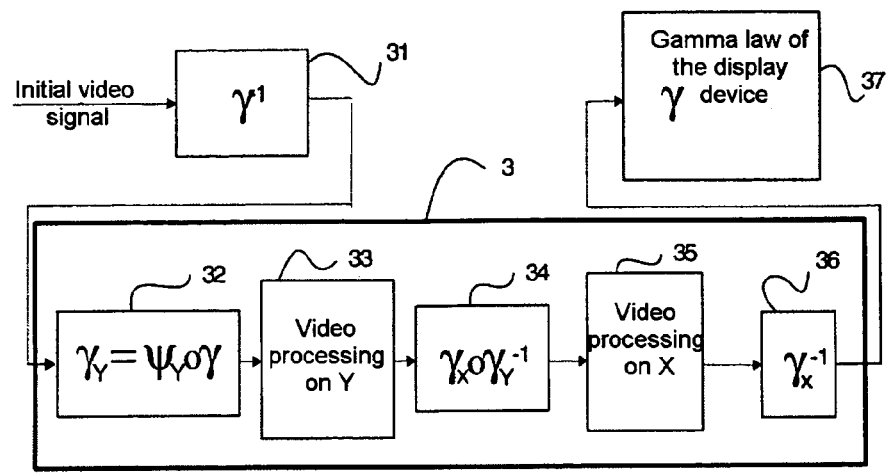
FIG. 3 illustrates a method of processing a video signal according to the invention, aimed at reducing the visual defects due to the display device, in the case where the initial video signal has been pre-corrected by an inverse gamma law.
Figure 4:
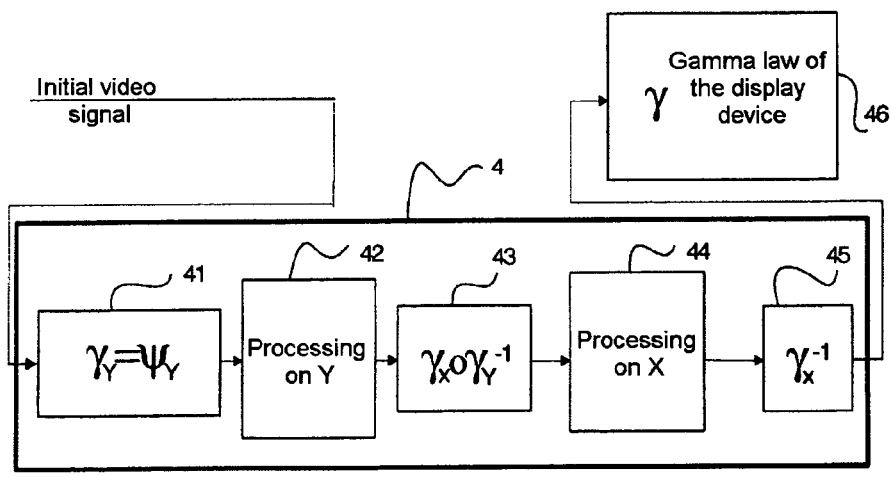
FIG. 4 illustrates a method of processing a video signal according to the invention, aimed at reducing the visual defects due to the display device, in the case where the initial video signal has not been pre-corrected by an inverse gamma law.

The method according to the invention is illustrated by FIGS. 3 and 4. It is referenced 3 in FIGS. 3 and 4 in FIG. 4. The method includes 5 steps referenced 32 to 36 in FIG. 3 and referenced 41 to 45 in FIG. 4.

The first step 32 of the method 3 (step 41 in the method 4) according to the invention consists in adopting a standpoint in a linear space in Y. For this purpose, a law $\gamma_Y$ characteristic of the vertical direction is applied to the initial video signal, pre-corrected 31 or otherwise by a global inverse gamma law. To apply this law, it is known to use a correspondence table which will associate with each input level an output level calculated according to the appropriate inverse gamma law.

During this operation, the resolution in terms of number of bits may be increased. This will make it possible in particular to eliminate certain quantization artefacts. The subsequent steps will therefore be carried out with a larger dynamic range in terms of number of bits and a return to the initial dynamic range will be effected upon the application of the last gamma law.

In the case where, the initial video signal has been pre-corrected by an inverse global gamma law, the law $\gamma_Y$ 32 is a composition of the law $\psi_Y$ and of the global gamma law, i.e.:

$\gamma_Y = \psi_Y o \gamma$, where o is the law of composition of the functions and $\psi_Y$ corresponds to the deviation between the global gamma law and the law $\gamma_Y$ measured along Y. $\gamma_Y$ is estimated directly according to a procedure described subsequently in the document. The gamma law being known, we deduce the law $\psi_Y$ therefrom.

In the case where, the initial video signal has not been pre-corrected by an inverse global gamma law, the law $\gamma_Y$ 41 is equal to the law $\psi_Y$: $\gamma_Y = \psi_Y$.

In order to compensate for the distortions introduced by the display device, a video processing making it possible to correct these distortions is applied to the video signal. This processing may for example be a filtering of the images of the video sequence. More precisely, it will be possible to apply a processing of re-interpolation of the images. It will also be possible to apply another video processing addressing a particular technical requirement of the display device.

For this purpose, the second step according to the invention 33, 42 therefore consists in re-interpolating the video image in Y by applying to the pixels a filter dependent on the Y displacement to be effected. It will for example be possible to apply a polyphase filter whose phase will be calculated on the basis of the shift in the position of the point to be calculated. Thus the phase will be zero if the point lies on the initial grid. It will be +0.5 if, the point is shifted by ½ of a pixel with respect to the initial grid. It will be possible to apply any other type of filter making it possible to re-interpolate an image (e.g. bicubic, bilinear filter).

According to the invention, after having processed the vertical components of the video signal, the horizontal components of the video signal are processed. It is then necessary to adopt a standpoint in a linear space in X. For this purpose, in a third step 34, 43, the following intermediate function $\gamma_{intermediate} = \gamma_X \circ \gamma_Y^{-1}$ is applied to the video signal arising from the previous step. For this step, it will also be possible to use a correspondence table which with each input level will associate an output level calculated according to the law $\gamma_{intermediate}$. The function $\gamma_X$ will be estimated with the procedure described later in the description.

According to the invention, the fourth step 35, 44 therefore consists in re-interpolating the video image in X by applying to the pixels a filter dependent on the X displacement to be effected.

Finally, the fifth step 36, 45 consists in correcting the signal processed by applying to the signal the law $\gamma_X^{-1}$ characteristic of the horizontal direction. For this step, it will also be possible to use a correspondence table which will restore the initial dynamic range if the latter was modified.

During the five steps described previously, it would also be possible to begin by processing the signal along the horizontal component (X) and then to subsequently process the signal along the vertical component (Y).

The video signal thus processed will thereafter be displayed by the display device 37, 46.

According to the invention, the procedure for estimating the gamma law according to the state of the art, described previously, will be adapted so as to estimate the laws $\gamma_X$ and $\gamma_Y$. For this purpose, in order to estimate $\gamma_X$, we display only horizontal lines 1 pixel high, separated by a sufficient number of black lines so as to eliminate the Y influences that may intervene from pixel to pixel (for example 4 black lines). We then measure the light level L(n) emitted by the screen for each input level n, then we normalize this curve by the maximum of these input levels: $\gamma_X = 255 \ast L(n)/L(255)$. We proceed in the same manner to estimate $\gamma_Y$, using vertical lines 1 pixel wide, separated by a sufficient number of black columns.

The inventive method can also be applied to laws other than gamma laws for correcting video signals.

Figure 5:
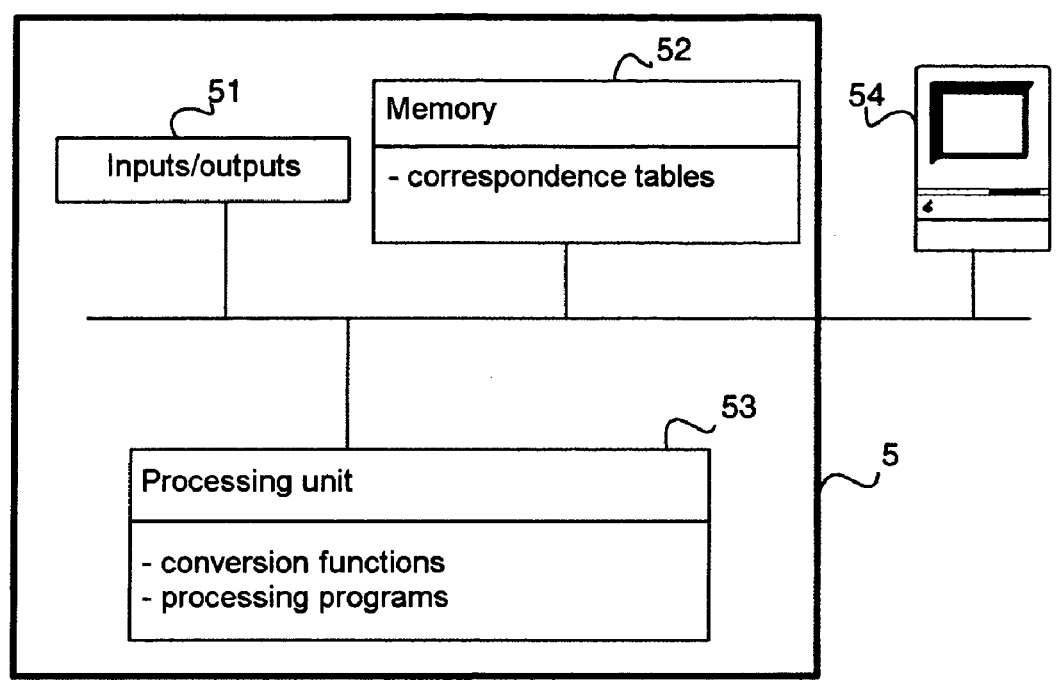
FIG. 5 illustrates a device for processing a video signal according to the invention, aimed at reducing the visual defects due to the display device.

The invention also relates to a device 5 linked to a display device 54 aimed at implementing the method described previously. Only the essential elements of the device are represented in FIG. 5. The device according to the invention contains in particular a memory 52 in which are stored the correspondence tables used for the processing by the various gamma laws 32, 34, 36, 41, 43, 45. The device also comprises a processing unit 53 such as a microprocessor or the like comprising the processing programs, in particular the re-interpolation program. The processing unit also comprises the conversion functions allowing the processing by the various gamma laws 32, 34, 36, 41, 43, 45. These functions utilize the correspondence tables stored in the memory. In addition, the device contains an input/output interface 51 for receiving the input video signal, pre-corrected or otherwise by the gamma law, and transmitting the video signal processed according to the method 3, 4 of the invention to the display device.

The invention claimed is:

1. Method of processing a video signal comprising a vertical component and a horizontal component, before the display of said signal by a display device, said method comprising:
   correcting said video signal by a specific gamma law associated with a first component from among said horizontal and vertical components of said video signal,
   applying a first video processing acting on said first component of the corrected video signal,
   applying, to the video signal processed, an intermediate law effecting the transfer from a space which is linear with respect to the first component to a space which is linear with respect to the other of said horizontal and vertical components, called the second component,
   applying a second video processing acting on said second component of the video signal emanating from said applying of an intermediate law, and
   correcting the video signal processed by a specific inverse gamma law associated with the second component of the video signal.

2. Method according to claim 1, wherein the intermediate gamma law is a composition of the law associated with the second component and of the inverse gamma law associated with the first component.

3. Method according to claim 1, wherein the corrections by the various gamma laws and the application of the intermediate law are performed with the aid of correspondence tables which with each input level of the video signal associate an output level calculated according to the appropriate law.

4. Method according to claim 1, wherein the first and second video processings are processings of re-interpolation of the video signal, respectively according to the first component and according to the second component of said signal.

5. Method according to claim 4, wherein the re-interpolation of the video signal consists of a filtering of said signal and in that the filter used is a polyphase filter.

6. Method according to claim 1, wherein the resolution in terms of number of bits of the video signal is increased during the step of correction by the specific gamma law associated with the first component of the video signal, and the resolution is returned to the initial resolution in terms of number of bits during the step of correction by the specific inverse gamma law associated with the second component of the video signal.

7. Method according to claim 5, wherein said method is applied to non-matrix display devices.

8. Device for processing a video signal comprising a vertical component and a horizontal component, before said video signal is displayed by a display device, wherein said device comprises:

means for correcting said video signal by a specific gamma law associated with a first component from among said horizontal and vertical components of said video signal, means for applying a first video processing acting on said first component of the corrected video signal, means for applying, to the video signal processed, an intermediate law effecting the transfer from a space which is linear with respect to the first component to a space which is linear with respect to the other of said horizontal and vertical components, called the second component; said means generating an intermediate signal, means for applying a second video processing acting on said second component of the intermediate video signal, and means for correcting the video signal processed by a specific inverse gamma law associated with the second component of the video signal.

9. The device according to claim 8, wherein the intermediate gamma law is a composition of the law associated with the second component and of the inverse gamma law associated with the first component.

* * * * *